United States Patent

Sugihara

[11] Patent Number: 6,123,641
[45] Date of Patent: Sep. 26, 2000

[54] TOROIDAL CONTINUOUSLY VARIABLE TRANSMISSION

[75] Inventor: Jun Sugihara, Yokosuka, Japan

[73] Assignee: Nissan Motor Co., Ltd., Yokohama, Japan

[21] Appl. No.: 09/343,249

[22] Filed: Jun. 30, 1999

[30] Foreign Application Priority Data

Jul. 2, 1998 [JP] Japan .................................. 10-187333

[51] Int. Cl.$^7$ .................................................. F16H 61/00
[52] U.S. Cl. .................................................. 476/10; 476/42
[58] Field of Search .................................. 474/9, 10, 42, 474/3

[56] References Cited

U.S. PATENT DOCUMENTS

| | | | |
|---|---|---|---|
| 5,575,732 | 11/1996 | Inoue | 476/10 |
| 5,643,132 | 7/1997 | Inoue | 476/10 |
| 5,681,236 | 10/1997 | Inoue | 476/10 |
| 5,707,313 | 1/1998 | Suzuki | 476/10 X |
| 5,711,741 | 1/1998 | Inoue | 476/10 |
| 5,779,591 | 7/1998 | Inoue | 476/10 X |
| 5,820,512 | 10/1998 | Nakano | 476/10 |
| 5,885,185 | 3/1999 | Kidokoro et al. | 476/10 |
| 5,902,207 | 5/1999 | Sugihara | 476/10 |
| 6,036,617 | 3/2000 | Kidokoro et al. | 476/10 X |

FOREIGN PATENT DOCUMENTS 10-148244  6/1998  Japan .

Primary Examiner—Rodney H. Bonck
Assistant Examiner—Saúl Rodriguez
Attorney, Agent, or Firm—Foley & Lardner

[57] ABSTRACT

Lateral wear of a contact position of a cam face of a precess cam which displaces in response to the gyrational state of a power roller and a cam follower which is provided on a feedback link is reduced. The cam follower (55) which contacts with the cam face (54) of the precess cam (52) is mounted on the feedback link (53) and the cam follower (55) comprises a three-dimensional curve such a rotating barrel-shaped body. Even if the cam face (54) of the precess cam (52) inclines, the cam follower (55) is normally maintained in a stable contact state. In this way, wear is reduced and durability is increased.

3 Claims, 7 Drawing Sheets

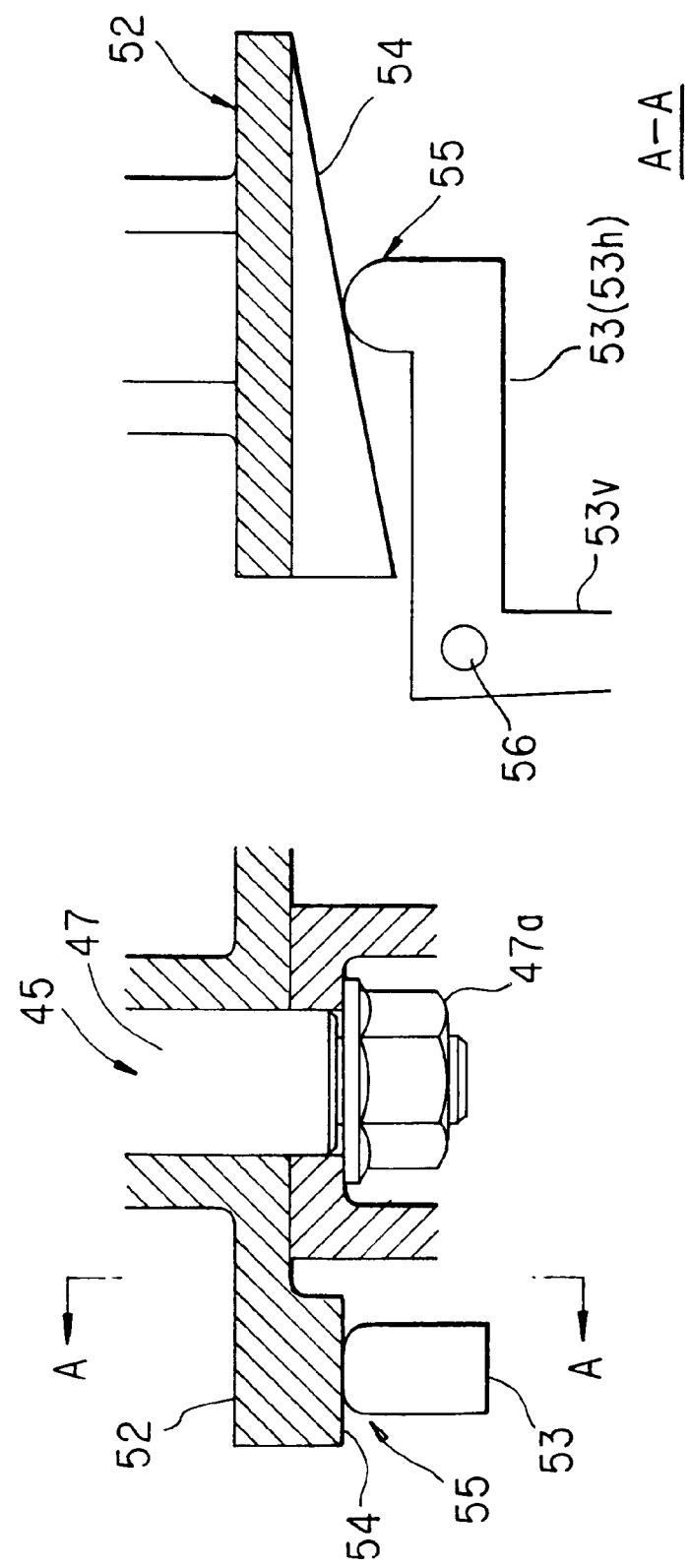

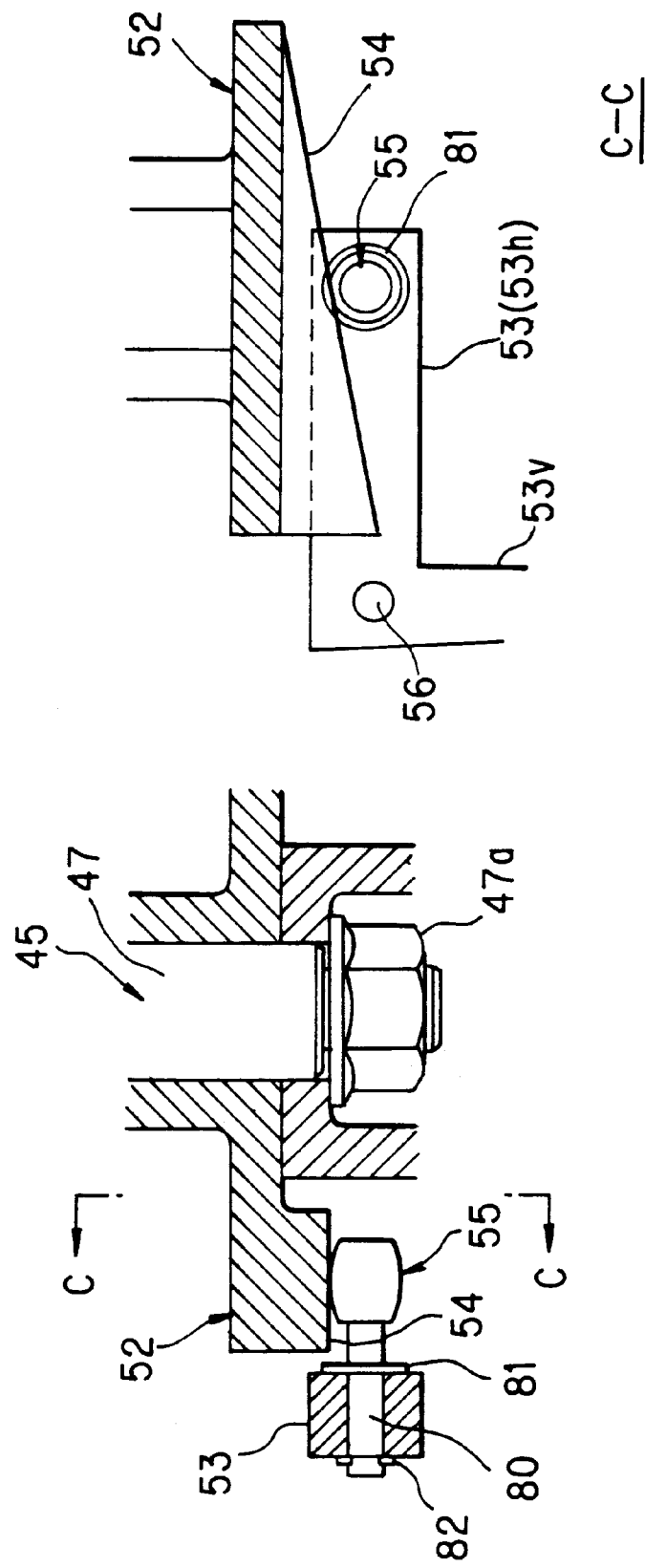

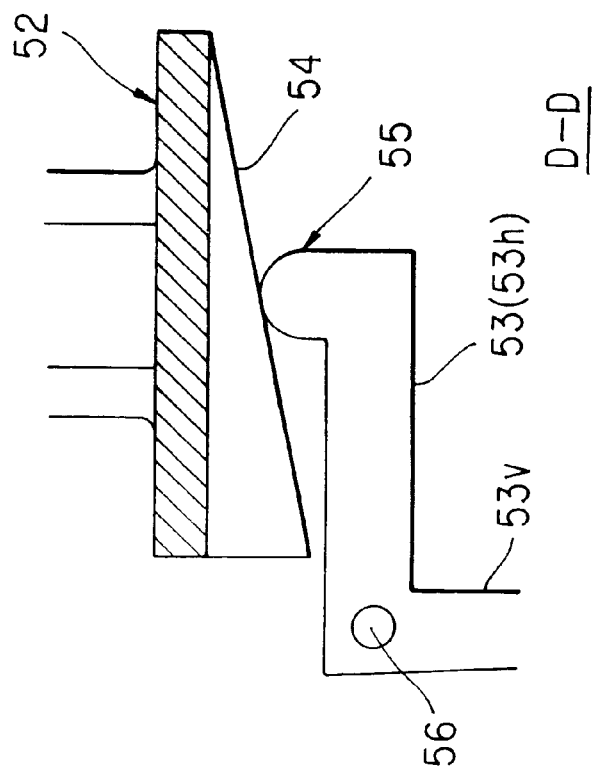
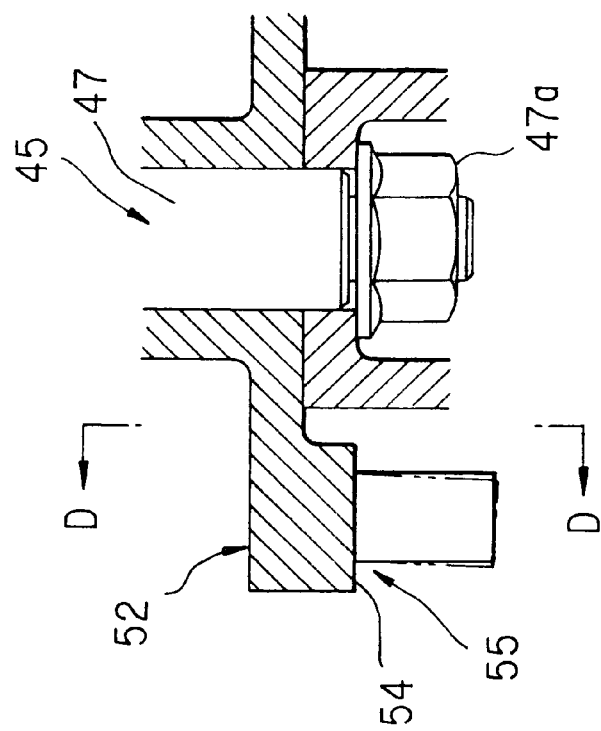

TOROIDAL CONTINUOUSLY VARIABLE TRANSMISSION

FIELD OF THE INVENTION

The present invention relates to a toroidal continuously variable transmission for use in a vehicle. In particular, it relates to feedback control mechanism for speed ratio control.

BACKGROUND TO THE INVENTION

A conventional toroidal continuously variable transmission is known for example by published application Tokkai-Hei-10-148244 filed by the present applicant in Japan. This toroidal continuously variable transmission disposes power rollers between an input disk and an output disk. The contact radius of the input and output disks is varied by variation in the angle of gyration of these power rollers. In such a way, the ratio of rotation speed transmitted from the input disk to the output disk is varied.

The power rollers are supported to freely vary an angle of gyration by trunnions. These trunnions are driven in the axial direction by an actuator in order to vary a speed ratio. The actuator is operated on the basis of a speed ratio control signal calculated depending on vehicle operating conditions. The operation of the actuator is feedback controlled so that the speed ratio control signal equals the actual speed ratio.

When the speed ratio is varied, the trunnions displace in the axial direction by rotating about a shaft. The motion of the trunnions is feedback being controlled by a cam mechanism.

However when a large force is applied to the power rollers, the shaft of the trunnion which supports the power roller is deformed. When the shaft of the trunnion deforms, the contacting surface of the cam which feedback controls the motion of the trunnion varies. Lateral wear is generated on the contact surface as a result of the transmission of the motion not being smoothly performed by the cam and the contact being in an inclined position as a result.

SUMMARY OF THE INVENTION

The present invention has the object of preventing lateral wear on a cam and increasing wear resistance even when trunnions are undergoing deformation.

In order to achieve above the object the present invention provides a vehicle-mounted toroidal continuously variable transmission. The transmission comprises a power roller disposed between an input disk and an output disk, the disks being opposed and rotatable, a trunnion supporting the power roller through an eccentric shaft, a control device driving the trunnion in an axial direction by an actuator to rotate the trunnion around the axis of a trunnion shaft to vary an angle of gyration of the power roller so as to vary a speed ratio, a cam member having a cam face displacing in response to rotation of the trunnion shaft, a cam follower having a contact face formed in a three dimensional curve with respect to the cam member, and a feedback mechanism performing feedback of motion of the cam follower to the control device controlling a displacement in an axial direction of the trunnion.

The details as well as other features and advantages of the invention are set forth in the remainder of the specification and are shown in the accompanying drawings.

BRIEF DESCRIPTION OF THE DRAWINGS

FIG. 4 is a detail of a first embodiment of a feedback link in a feedback mechanism, (4A) is a lateral view, (4B) is a cross sectional view along the line A—A.

FIG. 6 is a detail of a third embodiment of a feedback link in a feedback mechanism, (6A) being a lateral view, (6B) being a cross sectional view along the line C—C.

FIG. 7 is a detail of a feedback link in a conventional feedback mechanism, (7A) being a lateral view, (7B) being a cross sectional view along the line D—D.

DESCRIPTION OF THE PREFERRED EMBODIMENTS

Figure 1:
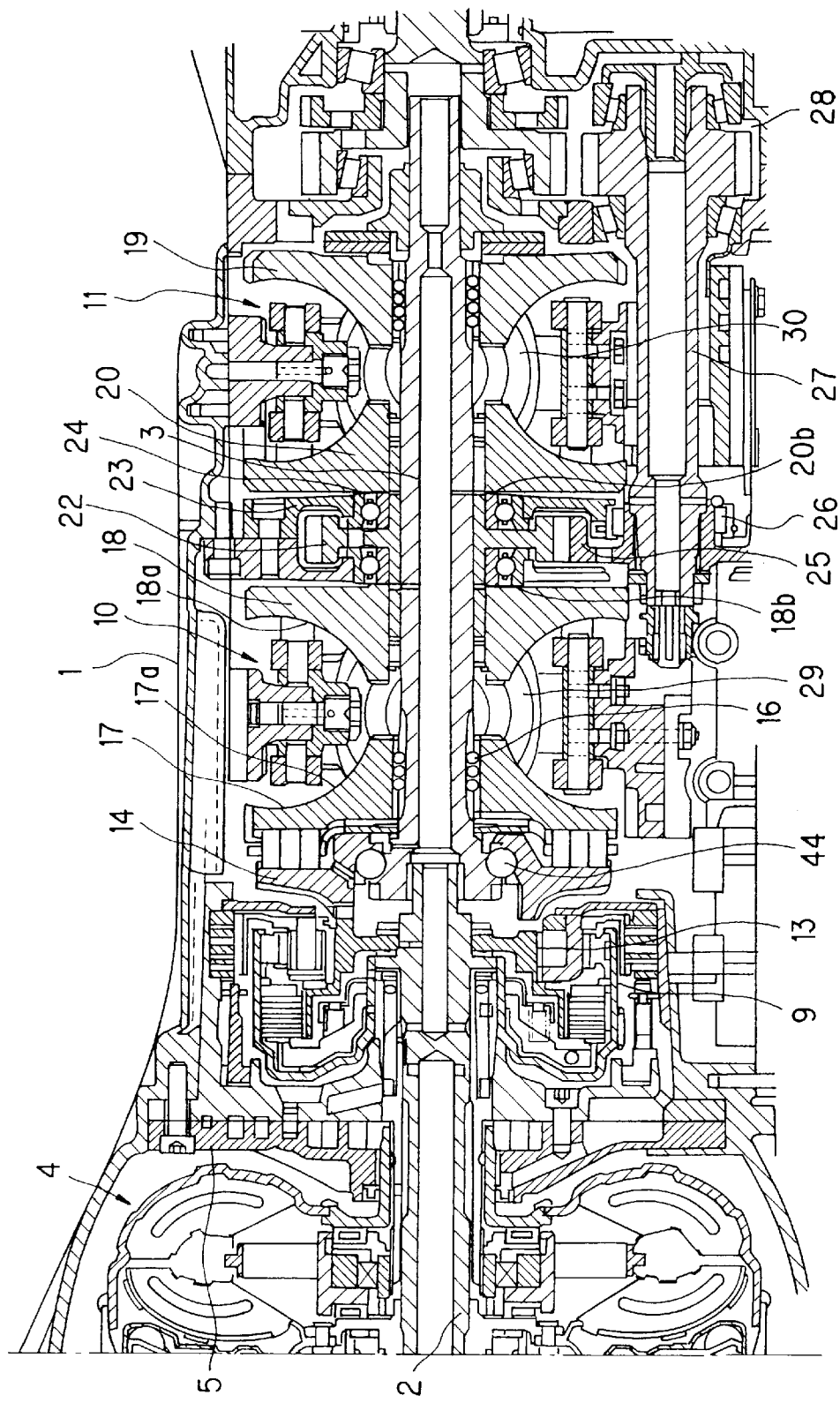
FIG. 1 is a longitudinal cross sectional view of an example of a toroidal continuously variable transmission.

Firstly, the sequence from input force to output force will be explained with reference to the schematic view of a toroidal continuously variable transmission shown in FIG. 1.

The rotational force of the engine is input into the input shaft 2 through a torque converter 4 in the transmission case 1. A rotation shaft 3 is disposed on the same axis on the right of the input shaft 2. An oil pump 5 is mounted on the input shaft 2 and a drive switching mechanism 9 is disposed to the right of the oil pump 5 to transmit the rotations of the input shaft 2 without variation or in a reversed state to the rotation shaft 3.

First and second toroidal variable mechanisms 10, 11 having two toroidal shaped cavities are mutually disposed separated in the axial direction on the rotation shaft 3.

An input disk 17 is supported in free rotation on the rotation shaft 3 through a ball spline 16 on the first toroidal variable mechanism 10. An output disk 18 is disposed co-axially on the rotation shaft 3 to rotate freely. A pair of power rollers 29 is sandwiched in the cavity formed by the toroidal face 17*a* of the input disk 17 and the toroidal face 18*a* of the input disk 18.

The power rollers 29 are supported to freely vary an angle of gyration by a support mechanism called a trunnion which will be discussed below. The contact position (contact radius) of the input disk 17 and output disk 18 with the power roller 29 is varied by operating the trunnion with an oil cylinder which will be discussed below. Thus the ratio of the speed change, that is to say, the drive ratio of the rotations transmitted from the input disk 17 to the output disk 18 may be continuously varied.

A loading cam 14 which transmits the rotations from the drive switching mechanism 9 above to the input disk 17 of the first toroidal variable mechanism 10 is disposed on the rear face of the input disk 17. The loading cam 14 presses the input disk 17 from the rear face in response to a torque of the input rotations. Thus the force of sandwiching the power roller 29 is increased in response to the torque transmitted between the input disk 17 to the output disk 18.

Thus rotational force from the engine which is transmitted to the input shaft 2 is adapted to be transmitted to the rotation shaft 3 sequentially via the loading cam 14 the input disk 17 and the ball spline 16 through the drive switching mechanism 9. The loading cam 14 is supported free to rotate on the rotation shaft 3 by a ball spline 44.

The second toroidal variable mechanism 11 has an input disk 19, an output disk 20, power rollers (frictional rollers)

30 in the same manner as the first toroidal variable mechanism 10 above. However the position of the input disk 19 and the output disk 20 is reversed with respect to the first toroidal variable mechanism 10. The output disk 18 of the first toroidal variable mechanism 10 and the output disk 20 of the second toroidal variable mechanism 11 are disposed next to each other.

An output gear 22 is disposed between the rear face of the output disks 18, 20. Cylindrical shafts 18b, 20b provided on the output gear 22 are respectively spline jointed to the inner peripheral face of each output disk 18, 20. Thus the output disks 18, 20 and the output gear 22 rotate in an integrated manner. The output gear 22 is supported to rotate freely through a bearing 24 on the gear housing 23 which is fixed to the inner peripheral wall of the transmission case 1.

The cylindrical shafts 18b, 20b are disposed on the outer periphery of the rotation shaft 3 and are adapted to rotate freely with respect to one another. As a result, the output disks 18, 20 rotate relative to the rotation shaft 3.

The output gear 22 meshes with a counter gear 25. The counter gear 25 is supported to freely rotate by a bearing 26 on the gear housing 23. The counter gear 25 is spline jointed at one end of a counter shaft 27 and the other end of the counter shaft 27 is supported to rotate freely on the transmission case 1.

The rotation force from the engine transmitted to the rotation shaft 3 is dispersed to the input disks 17, 19 of the first and second toroidal variable mechanisms 10, 11. After being transmitted to the output disks 18, 20 of each toroidal variable mechanism 10, 11 at a fixed drive ratio which depends on the gyrational operation of the power rollers 29, 39 discussed above, the rotational force of the engine is transmitted to the output shaft 33 through the output gear and through the sequence of the counter gear 25, the counter shaft 27 and the gear series 28.

Next the oil pressure cylinder mechanism and the support mechanism of the power rollers 29, 30 will be explained with reference to FIG. 2.

The pair of power rollers 29 which are sandwiched between the output disk 18 and the input 17 of the first toroidal variable mechanisms 10 are supported free rotate on an eccentric shaft 46 of a pair of trunnions 45 (in the figure, only one is visible). The trunnions 45 are respectively disposed to sandwich the rotation shaft 3. The eccentric shaft 46 tilts with respect to the rotating central shaft of the power roller 29 and the support shaft of the trunnion.

When the trunnion 45 displaces in the vertical direction of the figure, that is to say, in the direction of the Z axis, the eccentric axis 46 rotates eccentrically (swings) so that the center of rotation of the power roller 29 can maintain the same position (the same position as the central rotating axis of the input disk and the output disk). In this way, the central rotating axis of the power roller 29 displaces and the contact position with respect to the input disk 17 and the output disk 18 varies. Thus the trunnion 45 rotates around the axis of the shaft 47. As a result, the contact radius with respect to the input disk 17 and the output disk 18 of the power roller 29 varies and the drive ratio is varied.

Figure 2:
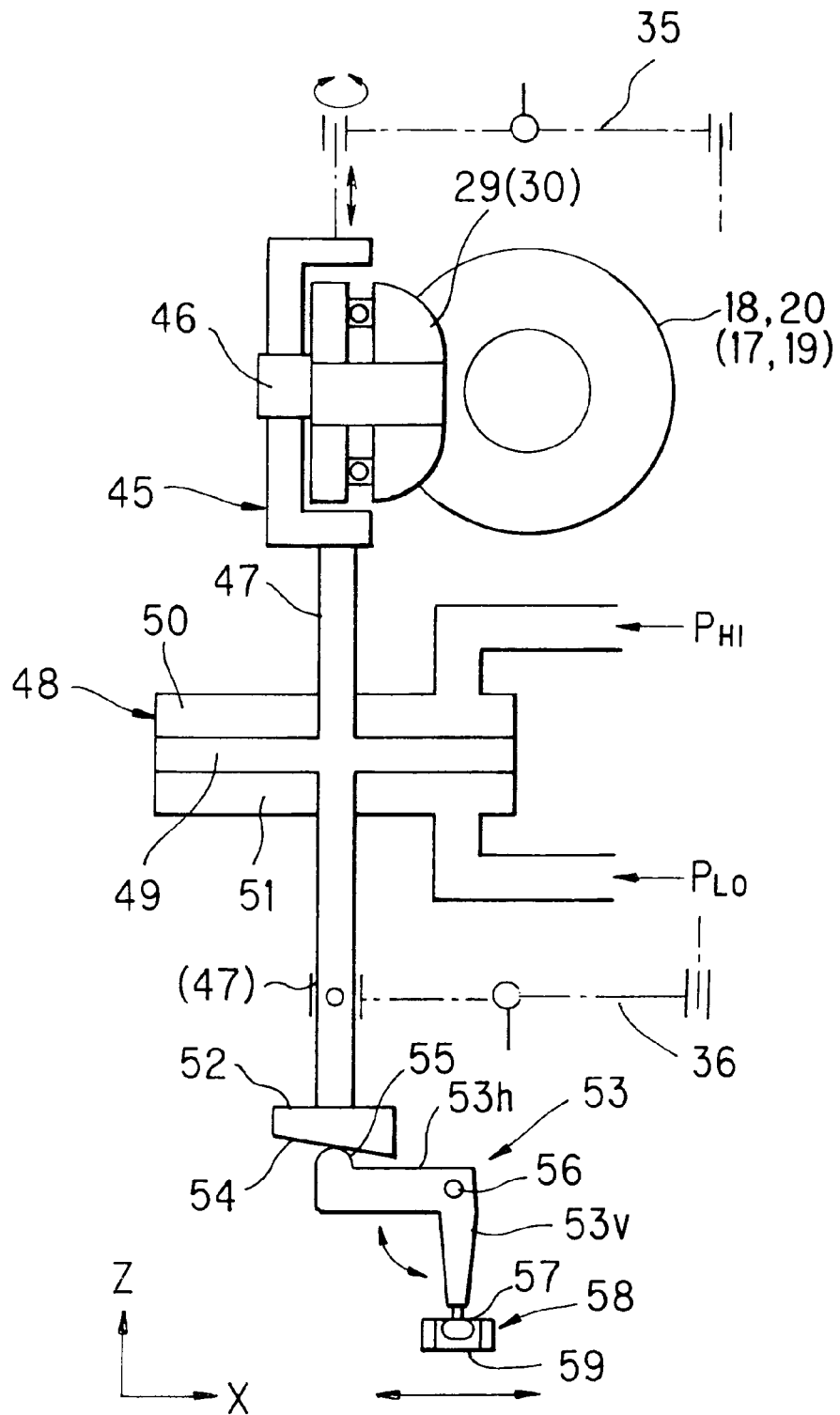
FIG. 2 shows a support mechanism of a power roller used in a toroidal continuously variable transmission

As the operation of the second toroidal variable mechanism 11 is identical to the above, the numerals of FIG. 2 are used to represent the same components.

Upper and lower portions of the trunnion 45 are supported by an upper link mechanism 35 and a lower link mechanism 36 which are displaced in a parallel position. Thus the trunnion 45 is supported to rotate freely about the shaft 47 and to displace in the axial direction of the shaft 47.

The upper link mechanism 35 and a lower link mechanism 36 are linked to the other trunnion (not shown) and as a result, the pair of power rollers are supported.

The shaft 47 of the trunnion 45 which extends in the lower section of the figure is connected to the piston 49 of the oil pressure cylinder 48.

When the oil pressure varies in the oil chambers 50, 51 of the cylinder 48, the piston 49 moves in the vertical direction. As a result, the power rollers 29 are displaced by each trunnion 45 in the Z axis direction. At this time, the trunnion 45 as discussed above rotates about the axis of the shaft 47 and the drive ratio is varied.

Even when the displacement of the trunnion 45 is the vertical direction is extremely slight, the gyration of the power rollers 29 is large and therefore the amount of variation of the drive ratio is proportional to the amount of rotation of the shaft 47.

The upper section in the figure of the oil chamber which is defined by the piston 49 of the cylinder 48 is taken to be the high-side oil chamber 50 in the upshift direction, that is to say, the direction in which the drive ratio is reduced. The lower section in the figure of the oil chamber which is defined by the piston 49 of the cylinder 48 is taken to be the low-side oil chamber 50 in the downshift direction, that is to say, the direction in which the drive ratio is reduced. The oil pressures applied on the respective oil passages are taken to be high oil pressure PH and low oil pressure PLO.

A precess cam 52 for transmitting the gyrational state of the power roller 29 to the feedback link 53 is disposed on the lower end of the shaft 47 of trunnion 45. A cam face 54 which is inclined along the outer periphery of the precess cam 52 is formed on the lower face of the precess cam 52. A cam follower 55 which is disposed on the distal end of the horizontal arm 53b of the feedback link 53 contacts with the cam face 54.

The feedback link 53 is supported so that the central section freely rotates with respect to the shaft 56. A ball connector 57 is mounted on the other end of the feedback link 53. A linking arm 58 which will be discussed below is linked to the ball connector 57.

Since the precess cam 52 is vertically integrated and rotates with the shaft 47 of the trunnion 45, the cam follower 55 which contacts with the cam face 54 displaces in the vertical direction, that is to say, the Z axial direction.

Thus the motion of the cam follower 55 expresses the gyration of the power roller 29 and therefore the actual drive ratio is expressed.

The feedback link 53 detects the actual drive ratio and is adapted to constitute a feedback mechanism which feedbacks information to a servomechanism to be discussed below.

The precess cam 52, as shown below in FIG. 4, is fixed to the trunnion 45 by a nut 47a which is threadably attached by a male screw on the lower end of the shaft 47 of the trunnion 45.

Figure 3:
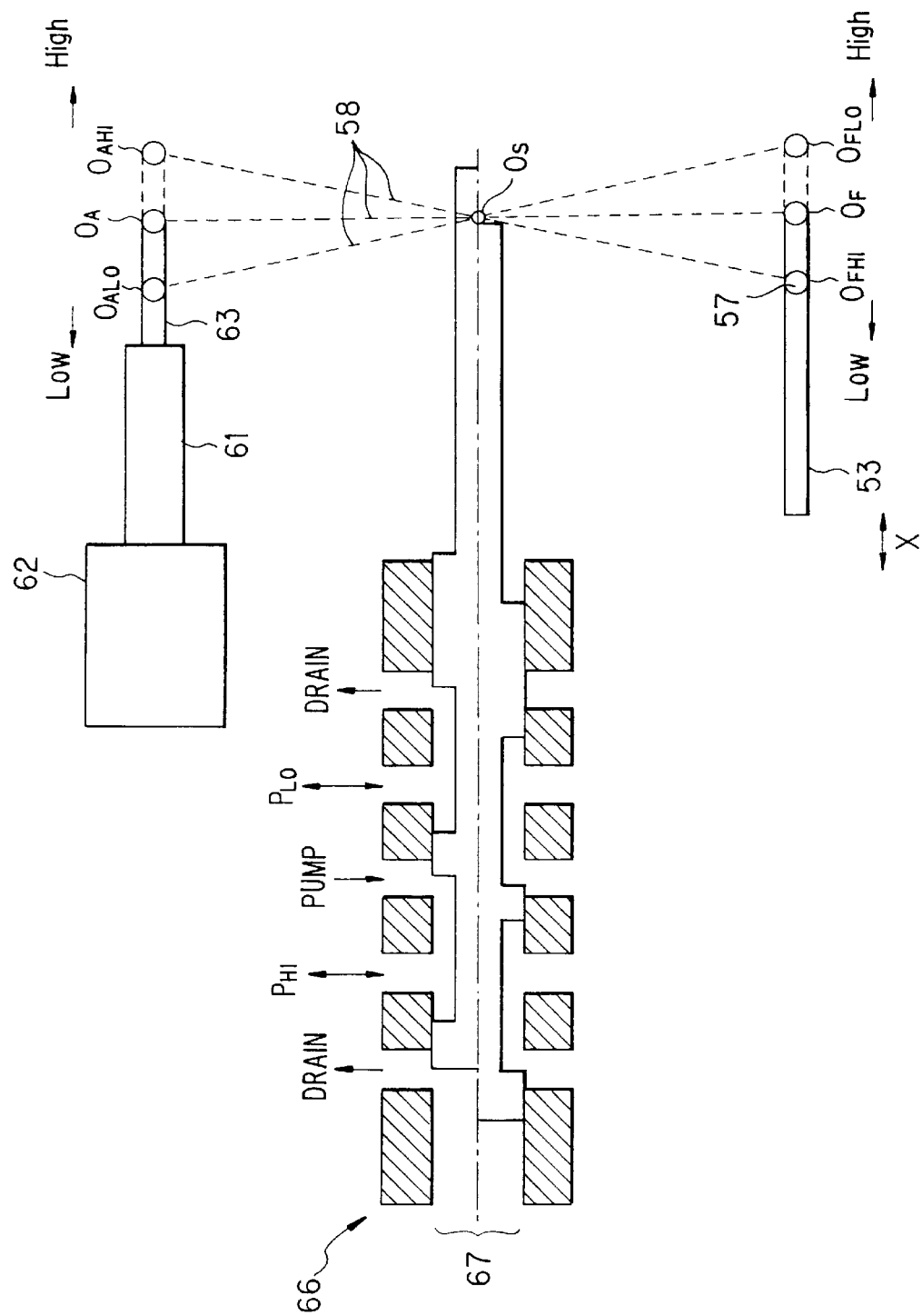
FIG. 3 shows a feedback control mechanism used in a toroidal continuously variable transmission.

A servo-mechanism which controls the oil pressure to each oil chamber 50, 51 of the cylinder 48 in order to realize a drive ratio in response to a speed ratio control signal is shown in FIG. 3.

A control valve 66 which controls the oil pressure which is supplied to the cylinder 48 is provided. The control valve 66 supplies one of the oil chambers 50 or 51 with high pressure from the pump in response to the displacement of a spool 67. At the same time, the other chamber is connected to a drain. In this way, the cylinder 48 is driven in one of two directions. The control valve 66 disconnects either cylinder above with respect to high or low pressure when the spool 67 is in a neutral position.

A drive mechanism 61 is provided in order to displace the spool 67 in response to a speed ratio control signal. The drive mechanism 61 is provided with a slider 63 which displaces due to the rotations of a step motor 62.

The distal end of a link arm 58 is connected to the distal end of a slider 63 and a central section of the link arm 58 is connected to the spool 67.

The other end of the link arm 58 is connected to the ball 57 of the feedback link 53.

The slider 63 and the spool 67 are provided in parallel and the ball 57 of the feedback link 53 is adapted to displace in parallel with the slider 63 and the spool 67. That is to say, the ball 57 displaces in the direction of the X axis as shown in FIG. 2.

Thus when the slider 63 of the drive mechanism 61 displaces in response to a speed ratio control signal, the link arm 58 inclines on the support point of the ball 57 of the feedback link 53. In this way, the spool 67, connected between the feedback link 53 and the ball 57, displaces. As a result, the control valve 66 is switched, the oil pressure between the oil chambers 50 and 51 of the cylinder 48 is varied and the piston 49 displaces. Therefore the gyrational angle of the power roller 29 varies and the drive ratio is varied in turn.

The trunnion 45 rotates about the periphery of the shaft due to the variation in the drive ratio and thus the feedback link 53 displaces through the precess cam 52 and the cam follower 55. Therefore the ball connector 57 displaces and tilts the joined link arm 53. As a result, the spool 67 is displaced in an opposite direction to the previous occasion.

In this way, the control valve 66 returns to a neutral position and the flow of oil to the oil chambers 50, 51 of the cylinder 48 is stopped and the piston 49 is maintained in the current speed ratio control position.

In FIG. 3, the link arm 58 which comprises a link mechanism is shown by the line connecting the connection point OA with the actuator 69 which contains the step motor 62, the connection point OF with the feedback link 53 which is a feedback mechanism, and the connection point OS with the spool 67 of the oil pressure control valve 66.

Increases or decreases in the drive ratio are determined by the switching direction in the control valve 66. This direction of switching is determined by the direction of displacement of the slider 63 of the drive mechanism 69.

On the other hand, the feedback link 53 which feedbacks the motion of the power roller 29 must accurately follow the motion of the precess cam 52.

As a result, the contact face of the cam follower 55 is shaped in an arc-shaped surface as shown in FIG. 4b in order to reduce resistance during sliding. Furthermore as shown in FIG. 4a, both ends of the cam follower 55 in the transverse direction which is orthogonal to the sloping face of the cam face 54 are formed in an arc shape. The cam follower 55 of the feedback link 53 comprises a three dimensional curve.

As discussed above, the power rollers 29, 30 are sandwiched between input disks 17, 19 and output disks 18, 20 by a force which corresponds to an input torque. The power rollers 29, 30 are pressured towards a rotational center due to the force. A force of bending acts on the shaft 47 and the trunnion 45 due to the force operating on the power rollers 29, 30.

As a result, the shaft 47 is deflected and the precess cam 52 mounted on its lower section gyrates in an orthogonal direction to the axial direction of the shaft 47.

When the precess cam 52 inclines in an orthogonal direction to the axial direction of the shaft 47, the contact of the cam face 54, the feedback link 53 and the cam follower 55 is concentrated on one side.

However in the present invention, since the cam follower 55 of the feedback link 53 is formed in a three-dimensional curve, even if the precess cam inclines, the contact with the cam face 54 is stable. Furthermore as there is no local increase in the contact pressure force, it is possible to prevent lateral wear of the contact point as a result.

In contrast, the cam follower of the conventional example as shown in FIG. 7 is not formed in an arc shape in the transverse direction which is orthogonal to the sloping face of the cam face 54. Thus when the cam face 54 of the precess cam 52 inclines, the edge of the cam follower 55 abuts with the cam face 54 and generates lateral wear.

The present invention prevents such lateral wear in the manner outlined above and thus increases component durability.

Figure 5B:
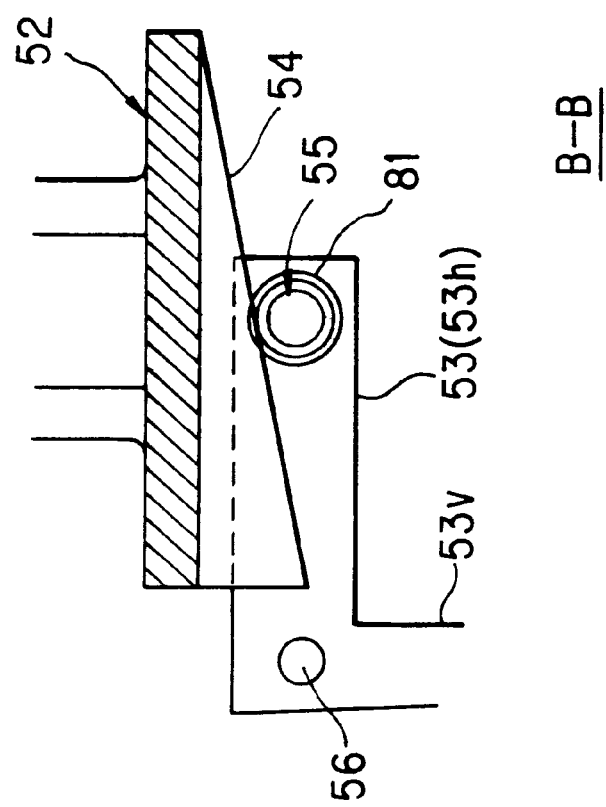
FIG. 5 is a detail of a second embodiment of a feedback link in a feedback mechanism, (5A) being a lateral view, (5B) being a cross sectional view along the line B—B.
Figure 5A:
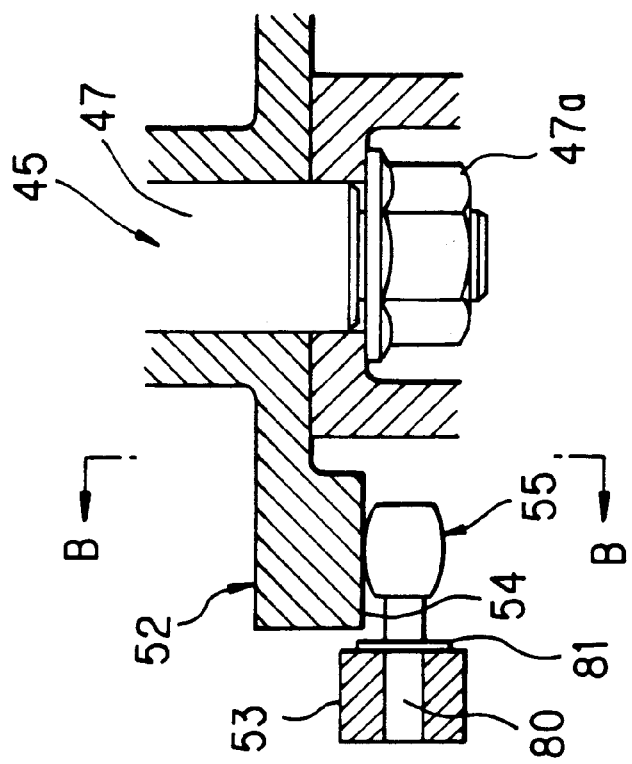

Next another embodiment of a cam follower 55 of the feedback link 53 will be explained with reference to FIG. 5.

In the first embodiment shown in FIG. 4, the cam follower 55 is integrated with a feedback link 53. However it is not necessary for the cam follower 55 to be integrated with the feedback link 53.

In the present embodiment, the cam follower 55 is formed in the shape of a barrel-shaped rotating body shaped in a three dimensional curve. The shaft 80 of the barrel-shaped cam follower 55 is inserted and fixed into a throughole in the feedback link 53. The insertion depth is determined by a flange section 81.

Not only is such an operation easily performed due to the formation of the cam follower 55 separately from the feedback link 53, but also it is possible to harden and increase the durability of the cam follower 55 by a simple heating process. This results in a reduction in costs on comparison with heat processing of the entire device.

A further embodiment of the present invention will be explained with reference to FIG. 6.

In this embodiment, the shaft 80 of the above cam follower 55 is slightly lengthened. The lengthened section is passed through the throughole in the feedback link 53. A stopper 82 is mounted on the distal end of the lengthened section with a C clip or the like and prevents dislodging. The cam follower 55 is mounted to be rotatable with respect to the feedback link 53.

Therefore the cam follower 55 rotatably contacts with the actual cam face 54 and thus wear can be substantially reduced. Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. A vehicle mounted toroidal continuously variable transmission comprising:

a power roller disposed between an input disk and an output disk, said disks being opposed and rotatable;

a trunnion supporting said power roller tough an eccentric shaft;

a control device driving said trunnion in an axial direction by an actuator to rotate said trunnion around the axis of a trunnion shaft to vary an angle of gyration of said power roller so as to vary a speed ratio;

a cam member having a cam face displacing in response to rotation of said trunnion shaft;

a cam follower having a contact face that partly contacts said cam member wherein all periheral edges of the contact face are formed as arc surfaces; and a feedback mechanism performing feedback of motion of said cam follower to said control device controlling a displacement in an axial direction of said trunnion.

2. A vehicle mounted toroidal continuously variable transmission transmission comprising:

a power roller disposed between an input disk and an output disk, said disks being opposed and rotatable;

a trunnion supporting said power roller through an eccentric shaft;

a control device driving said trunnion in an axial direction by an actuator to rotate said trunnion around the axis of a trunnion shaft to vary an angle of gyration of said power roller so as to vary a speed ratio;

a cam member having a cam face displacing in response to rotation of said trunnion shaft;

a cam follower having a contact face formed in a three dimensional curve with respect to said cam member; and a feedback mechanism performing feedback of motion of said cam follower to said control device controlling a displacement in an axial direction of said trunnion, wherein said cam follower is formed as a rotating barrel-shaped body contacting on an outer peripheral face with respect to said cam face.

3. A toroidal continuously variable transmission according to claim 2 wherein said rotating barrel-shaped body is mounted to be freely rotatable so as to be rotatable contact with said cam face.

* * * * *